United States Patent
Hu et al.

(10) Patent No.: US 10,868,666 B2
(45) Date of Patent: Dec. 15, 2020

(54) FULLY HOMOMORPHIC ENCRYPTION METHOD BASED ON MODULAR OPERATION

(71) Applicants: Shenzhen FHE technologies Co., Ltd, Shenzhen (CN); Heping Hu, Shenzhen (CN)

(72) Inventors: Heping Hu, Shenzhen (CN); Yunfeng Liao, Shenzhen (CN)

(73) Assignees: SHENZHEN FHE TECHNOLOGIES CO., LTD, Shenzhen (CN); Heping Hu, Shenzhen (CN)

( * ) Notice: Subject to any disclaimer, the term of this patent is extended or adjusted under 35 U.S.C. 154(b) by 206 days.

(21) Appl. No.: 16/106,029

(22) Filed: Aug. 21, 2018

(65) Prior Publication Data
US 2018/0359079 A1   Dec. 13, 2018

Related U.S. Application Data

(63) Continuation-in-part of application No. PCT/CN2017/112482, filed on Nov. 23, 2017.

(30) Foreign Application Priority Data

Dec. 13, 2016  (CN) .......................... 2016 1 1145127

(51) Int. Cl.
  *H04L 29/06* (2006.01)
  *H04L 9/00* (2006.01)
(52) U.S. Cl.
  CPC .......... *H04L 9/008* (2013.01); *H04L 2209/08* (2013.01)

(58) Field of Classification Search
CPC ........................... H04L 9/008; H04L 2209/08
See application file for complete search history.

(56) References Cited

U.S. PATENT DOCUMENTS

| | | | |
|---|---|---|---|
| 6,480,605 B1 * | 11/2002 | Uchiyama | H04L 9/3013 380/259 |
| 6,785,388 B1 * | 8/2004 | Kasahara | H04L 9/002 380/28 |
| 9,442,980 B1 * | 9/2016 | Trepetin | G06F 21/6254 |
| 9,946,810 B1 * | 4/2018 | Trepetin | H04L 63/0428 |
| 2005/0157872 A1 * | 7/2005 | Ono | H04L 9/3249 380/28 |
| 2006/0227965 A1 * | 10/2006 | Zhu | H04L 9/0637 380/37 |

(Continued)

*Primary Examiner* — Manfuzur Rahman
(74) *Attorney, Agent, or Firm* — Matthias Scholl P.C.; Matthias Scholl

(57) ABSTRACT

A fully homomorphic encryption method based on modular operation, the method including: acquiring a plaintext of any numerical value data type in an encryption process and converting the plaintext to a corresponding plaintext system plaintext according to an encryption requirement; performing an encryption operation on each number in the system plaintext, and combining ciphertexts acquired by the encryption operation to obtain a corresponding ciphertext combination; performing a ciphertext operation on the ciphertext combination using a ciphertext source code, a ciphertext radix-minus-one complement, and a ciphertext complement code based on modular encryption; and using modular division to decrypt a result of the ciphertext operation to obtain a decrypted plaintext.

9 Claims, 3 Drawing Sheets

(56) References Cited

U.S. PATENT DOCUMENTS

| | | | |
|---|---|---|---|
| 2006/0251248 A1* | 11/2006 | Lipson | H04L 9/002 380/44 |
| 2017/0155628 A1* | 6/2017 | Rohloff | H04L 63/0478 |
| 2017/0366349 A1* | 12/2017 | Lyubashevsky | H04L 9/3006 |
| 2017/0366358 A1* | 12/2017 | Lyubashevsky | H04L 63/123 |
| 2018/0019866 A1* | 1/2018 | Kerschbaum | H04L 9/0618 |

* cited by examiner

FULLY HOMOMORPHIC ENCRYPTION METHOD BASED ON MODULAR OPERATION

CROSS-REFERENCE TO RELATED APPLICATIONS

This application is a continuation-in-part of International Patent Application No. PCT/CN2017/112482 with an international filing date of Nov. 23, 2017, designating the United States, now pending, and further claims foreign priority benefits to Chinese Patent Application No. 201611145127.8 filed Dec. 13, 2016. The contents of all of the aforementioned applications, including any intervening amendments thereto, are incorporated herein by reference. Inquiries from the public to applicants or assignees concerning this document or the related applications should be directed to: Matthias Scholl P. C., Attn. Dr. Matthias Scholl Esq., 245 First Street, 18th Floor, Cambridge, Mass. 02142.

BACKGROUND

The disclosure relates to the field of information security, and more particularly, to a fully homomorphic encryption method based on modular operation.

A fully homomorphic encryption (FHE) scheme allows anyone to transform an encryption of a message into an encryption of any (efficient) function of that message, without knowing the secret key.

Existing FHE schemes, such as somewhat homomorphic encryption scheme, ideal lattice-based scheme, Learning with Errors (LWE) problem based scheme, and ring-LWE scheme, have the common trait that they add a small "noise" component during encryption. Computing homomorphically on ciphertexts will cause these noises to grow up to a point when they become so large that decryption fails.

SUMMARY

In view of the above-described problems, it is one objective of the disclosure to provide a fully homomorphic encryption method based on modular operation.

To achieve the above objective, in accordance with one embodiment of the disclosure, there is provided a fully homomorphic encryption method based on modular operation, the method comprising:
(1) acquiring the plaintext of any numerical value data type in the encryption process and converting the plaintext to the corresponding plaintext system plaintext according to the encryption requirement;
(2) performing an encryption operation on each number in the system plaintext acquired in (1), and combining the ciphertexts acquired by the encryption operation to obtain a corresponding ciphertext combination;
(3) performing a ciphertext operation on the ciphertext combination acquired in (2) using a ciphertext source code, a ciphertext radix-minus-one complement, and a ciphertext complement code based on modular encryption; and
(4) using modular division to decrypt the result of the ciphertext operation acquired in (3) to obtain the decrypted plaintext.

The encryption operation in (2) can use the following formula:

$$c=(m+s*r+p*q) \bmod x_0$$

where c represents a ciphertext, m represents a system digit in a plaintext, s represents a system used in encryption, r represents a random number, p is an encryption key, and $x_0$ is an intermediate variable, which is equal to the product of the encryption key p and another encryption key q. These keys described are not publicly disclosed.

(4) can use the following formula: (c mod p) mod s.

In (3), for the ciphertext addition operation, two ciphertexts can be directly combined to perform the alignment summation operation.

In (3), for the ciphertext subtraction operation, a radix-minus-one complement of the ciphertext combination of the subtrahend can be acquired first, then the corresponding complement code is acquired according to the radix-minus-one complement, and finally the alignment summation operation is performed on the complement code and the source code of the ciphertext combination of the minuend.

In (3), for the ciphertext multiplication operation, an n*(2n−1) matrix can be first created based on the number n of elements in the ciphertext combination $c_1$ and $c_2$, wherein the elements in the first row of the matrix from right to left are: the product of the rightmost element in $c_1$ and the rightmost element in $c_2$, the product of the second last element on the right in $c_1$ and the rightmost element in $c_2$, and so on, and the product of the first element on the left in $c_1$ and the rightmost element in $c_2$, respectively; the elements in the second row of the matrix from right to left are: one 0, the product of the rightmost element in $c_1$ and the second last element on the right in $c_2$, the product of the second last element on the right in $c_1$ and the second last element on the right in $c_2$, and so on, and the product of the first element on the left in $c_1$ and the second last element on the right in $c_2$, respectively; ... the elements in the nth row of the matrix from right to left are: (n−1) zeros, the product of the rightmost element in $c_1$ and the first element on the left in $c_2$, the product of the second last element on the right in $c_1$ and the first element on the left in $c_2$, and so on, and the product of the first element on the left in $c_1$ and the first element on the left in $c_2$, respectively. Then, each column of the constructed matrix is summed to obtain a new row vector. The row vector is taken as the result of the ciphertext multiplication operation. Finally, the row vector is taken as the result of the ciphertext multiplication operation.

In (3), the ciphertext division operation can comprise the following sub-steps:
(3.1) creating a storage format of an empty division operation result, which has a total length of 32 bits, 64 bits, or 80 bits, comprising a sign bit, an integer bit, and a decimal place, and extending the binary plaintext according to the storage format;
(3.2) performing an encryption operation on the extended binary plaintext according to the algorithm in (2), and combining the encryption operation results to obtain the corresponding ciphertexts as the dividend and the divisor, respectively;
(3.3) multiplying the ciphertext of 1 obtained in (2) by the ciphertext as a divisor;
(3.4) setting the initial value of the decimal counter count to be equal to the length of the storage format minus L, where L is the length of the integer bit in the storage format;
(3.5) judging whether the ciphertext of the dividend is greater than the ciphertext of the divisor, proceeding to (3.6) if greater than the ciphertext, and proceeding to (3.7) if not;
(3.6) adding the ciphertext of the dividend and the complement code of the ciphertext of the divisor in (3.3) to obtain the remainder as a new dividend, and adding the ciphertexts of 1 in the integer bit to obtain the ciphertext quotient, and returning to (3.5);

(3.7) judging whether all the ciphertexts of the remainder are zero or the decimal counter count is greater than the total length of the storage format, proceeding to (3.8) if not; ending the ciphertext division operation and proceeding to (3.13) to obtain the result of the ciphertext division operation if so;

(3.8) adding the ciphertext of 0 to the rightmost side of the remainder ciphertext to obtain a new remainder ciphertext, and proceeding to (3.9);

(3.9) judging whether the new remainder ciphertext obtained in (3.8) is greater than the ciphertext of the divisor, proceeding to (3.10) if so, and proceeding to (3.11) if not;

(3.10) adding the new remainder ciphertext and the complement code of the ciphertext of the divisor to obtain a new remainder ciphertext again, and setting the value of the count-th decimal place as a ciphertext value corresponding to 1;

(3.11) setting the value of the count-th decimal place as the ciphertext value corresponding to 0, and then proceeding to (3.12);

(3.12) adding 1 to the decimal counter, and then returning to (3.7); and (3.13) acquiring the integer part and the decimal part of the quotient according to the obtained ciphertext value, and storing the integer part and the decimal part according to the storage format in (3.1).

The integer part of the quotient can be equal to:
$x_L*2^0+x_{L-1}*2^1+ \ldots +x_1*2^{L-1}$, where x represents the ciphertext value in the integer part; and the decimal part of the quotient can be equal to:
$y_1*2^{-1}+y_2*2^{-2}+ \ldots +y_{\textit{total length of the storage format}-L}*2^{\textit{total length of the storage format}-L}$, where y represents the ciphertext value in the decimal part.

(3.5) can be implemented as follows: judging whether the ciphertext of the dividend is greater than the ciphertext of the divisor is to judge whether each bit in the dividend is greater than or equal to the corresponding bit in the divisor in a traversing manner from left to right. If there is one bit less than the corresponding bit in the divisor, it indicates that the ciphertext of the dividend is not a ciphertext greater than the divisor.

In the ciphertext addition operation, the corresponding ciphertext of each bit of the ciphertext can be first obtained according to a decryption formula (ciphertext mod p) mod s, and the obtained plaintext is summed and added bitwise. Then it is judged whether the value obtained by summing each bit is equal to the system, it indicates that a carry occurs if so, a carry value is returned at this time, the result of the summation of a ciphertext bit is returned, and 1 is added in the summation process of the previous bit of the ciphertext bit; and it indicates that no carry occurs if not, a carry value and the result of the summation of a ciphertext bit are returned at this time, and 0 is added in the summation process of the previous bit of the ciphertext bit.

The disclosure also provides a fully homomorphic encryption system based on modular operation, the system comprising:

an acquiring module configured for acquiring a plaintext of any numerical value data type in an encryption process and converting the plaintext to a corresponding plaintext system plaintext according to an encryption requirement;

an encryption operation module configured for performing an encryption operation on each number in the system plaintext acquired in (1), and combining ciphertexts acquired by the encryption operation to obtain a corresponding ciphertext combination;

a cryptographic operation module configured for performing a ciphertext operation on the ciphertext combination acquired in the encryption module using a ciphertext source code, a ciphertext radix-minus-one complement, and a ciphertext complement code based on modular encryption; and a decryption module configured for using modular division to decrypt a result of the ciphertext operation acquired in the cryptographic module to obtain a decrypted plaintext.

The encryption operation in the encryption module can use the following formula:

$$c=(m+s*r+p*q) \bmod x_0,$$

c represents a ciphertext, m represents a system digit in a plaintext, s represents a system used in encryption, r represents a random number, p is an encryption key, and $x_0$ is an intermediate variable which is equal to a product of the encryption key p and another encryption key q; and the keys are not publicly disclosed.

The decryption module can use the following formula: (c mod p) mod s.

In the cryptographic module for a ciphertext addition operation, two ciphertexts can be combined to perform an alignment summation operation.

In the cryptographic module, for a ciphertext subtraction operation, a radix-minus-one complement of the ciphertext combination of the subtrahend can be acquired first, then the corresponding complement code is acquired according to the radix-minus-one complement, and finally an alignment summation operation is performed on the complement code and the source code of the ciphertext combination of the minuend.

In the cryptographic module, for a ciphertext multiplication operation, an n*(2n−1) matrix can be first created based on the number n of elements in the ciphertext combination $c_1$ and $c_2$, the elements in the first row of the matrix from right to left are: the product of the rightmost element in $c_1$ and the rightmost element in $c_2$, the product of the second last element on the right in $c_1$ and the rightmost element in $c_2$, and so on, and the product of the first element on the left in $c_1$ and the rightmost element in $c_2$, respectively; the elements in the second row of the matrix from right to left are: one 0, the product of the rightmost element in $c_1$ and the second last element on the right in $c_2$, the product of the second last element on the right in $c_1$ and the second last element on the right in $c_2$, and so on, and the product of the first element on the left in $c_1$ and the second last element on the right in $c_2$, respectively; . . . the elements in the nth row of the matrix from right to left are: (n−1) zeros, the product of the rightmost element in $c_1$ and the first element on the left in $c_2$, the product of the second last element on the right in $c_1$ and the first element on the left in $c_2$, and so on, and the product of the first element on the left in $c_1$ and the first element on the left in $c_2$, respectively; then, each column of the constructed matrix is summed to obtain a new row vector; the row vector is taken as the result of the ciphertext multiplication operation; finally, the row vector is taken as the result of the ciphertext multiplication operation.

Also provided is a fully homomorphic encryption circuit for implementing a fully homomorphic encryption method based on mode operation, the circuit comprising an input data register, a command register, a state register, a cryptographic operation circuit, a logic control circuit, an output data register, and a data storage area RAM.

The input data register is configured to obtain processed data and private data, transmits the processed data to the cryptographic operation circuit, and stores the private data in the data storage area RAM for the cryptographic operation circuit; the cryptographic operation circuit is configured to obtain private data from the data storage area RAM; the command register is configured to obtain user commands from the local bus and transmit the user commands to the logic control circuit; the logic control circuit is configured to control the cryptographic operation circuit to perform the encryption and decryption function and the ciphertext operation function according to the user commands, and transmit the result to the state register, in which a random number used in the encryption process is generated by a random number generator; the state register is configured to obtain an execution result from the logic control circuit and transmit the execution result via the local bus to the interface circuit; the data storage area RAM is configured to transfer data processed by the cryptographic operation circuit to the output data register; and the output data register receives data from the data storage area RAM and transmits the data to the local bus.

In general, the above technical solutions conceived by the disclosure can achieve the following advantageous effects:

(1) The disclosure can solve the technical problem in the existing method that the encryption result cannot be decrypted correctly since it is difficult to control the ciphertext multiplication noise: since the disclosure uses the carry mechanism in the encryption process and the refresh of the ciphertext calculation result, the disclosure can solve the problem of noises appearing in the fully homomorphic encryption process.

(2) The disclosure can solve the technical problem in the existing method that the encryption result cannot be decrypted correctly since the result of the ciphertext summation malfunctions in the decryption process when the result of the ciphertext summation is equal to the system: since the disclosure uses the carry mechanism in the encryption process, the carry mechanism determines whether a carry operation is required by judging whether the result of the ciphertext summation is equal to the system, thus solving the problem that the ciphertext summation malfunctions.

(3) The disclosure can perform addition, subtraction, multiplication, and division operations between arbitrary data ciphertexts through a ciphertext source code, a ciphertext radix-minus-one complement, and a ciphertext complement code based on modular encryption, thereby further extending the application scenario of the disclosure and improving the data security in the ciphertext calculation process of the application scenario.

DETAILED DESCRIPTION

Figure 1:
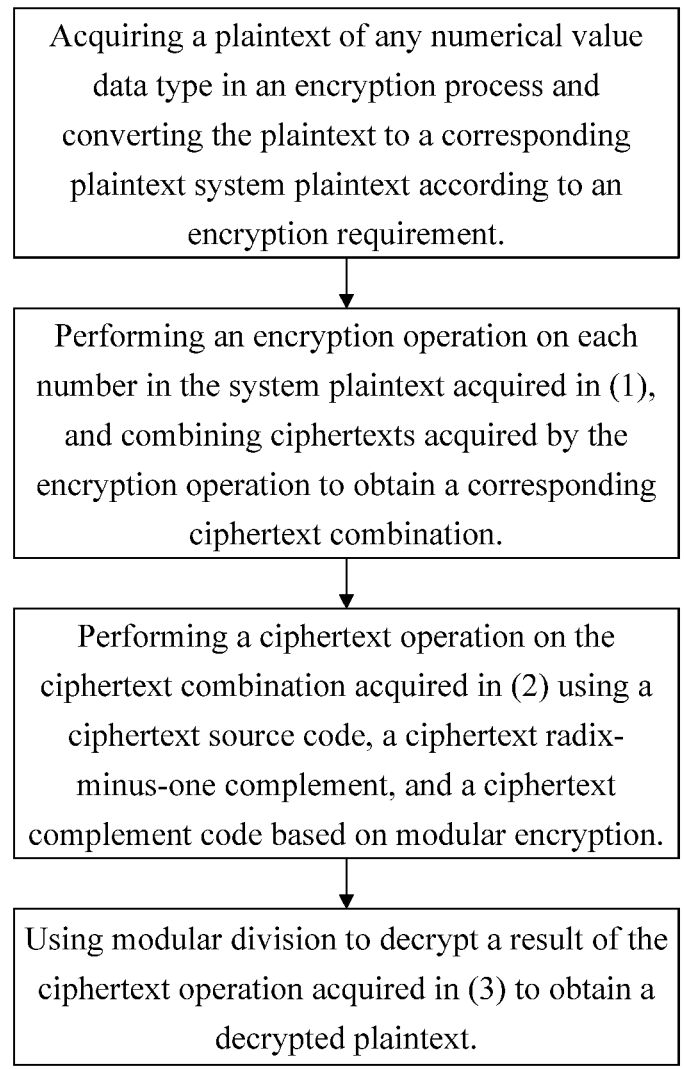
FIG. 1 is a flowchart illustrating a fully homomorphic encryption method based on modular operation according to the disclosure.

For further illustrating, experiments detailing a fully homomorphic encryption method based on modular operation are described below. It should be noted that the following examples are intended to describe and not to limit the disclosure.

System digit: according to the number of bits determined by the system, for example: binary is 1 bit, octal is 3 bits, hexadecimal is 4 bits, duotricemary notation is 5 bits, base 64 is 6 bits, and base 128 is 7 bits.

The method of the disclosure uses a ciphertext source code, a ciphertext radix-minus-one complement, and a ciphertext complement code based on modular encryption to realize encryption, decryption and ciphertext calculation of all data types. The method realizes the ciphertext calculation of arithmetic operation, relational operation, and logical operation by constructing a circuit function to refresh ciphertexts. The arithmetic operation comprises the operations such as addition, subtraction, multiplication, and division (+, −, *, /), the relational operation comprises the operations such as less than, less than or equal to, greater than, greater than or equal to, equal to, and not equal to (<, ≤, >, ≥, =, ≠) and the logical operation comprises the operations such as and, or, and not.

A fully homomorphic encryption method based on modular operation comprises data representation, key generation, encryption algorithm, decryption algorithm, and Ciphertext Operation (CO).

The data representation: the type of the plaintext m is denoted as T, and the set of T is denoted as {Integer, Real, Character, Date, Boolean}, etc. and the plaintext ms is known as $m_s$, where: s represents the data system, i.e., binary, decimal, base 521, etc., denoted as (T, $m_s$); for example: s=2 represents binary, binary is usually denoted as B, and plaintext m is denoted as binary $m_B$, denoted as (T, $m_B$); s=16 represents hexadecimal, hexadecimal usually denoted by H, and plaintext m represents hexadecimal digit $m_H$, denoted as (T, $m_H$); s=512 represents base 512, and plaintext m is denoted as base 512 $m_{512}$, denoted as (T, $m_{512}$), and so on.

Key generation (KeyGen): a large odd number p is selected, $x_0=q_0*p+s*r$ is calculated, $x_0$ must be an odd number, otherwise, it is recalculated. τ numbers are randomly generated and $x_i=q_i*p+s*r$ is calculated, where $0 \leq i \leq \tau$, $q_i \ll q_0$, and r is a random number. The public key used for the asymmetric algorithm is $pk=(x_0, x_1, \ldots, x_i, \ldots x_\tau)$, the private key is p; the key used for the symmetric algorithm is $(x_0, p)$. A working key $W_{key}$ (pk, p) is introduced in order to clearly express the algorithmic description of the encryption, decryption and ciphertext calculation.

Encryption algorithm (Enc): The working key $W_{key}$ generated by KeyGen is encrypted for any number m. m is converted to binary $m_B$ denoted as B, $B=(b_1, b_2, b_i, \ldots, b_n)$, $b_i \in \{0,1\}$, $1 \leq i \leq n$, $c=Enc(W_{key}, B)$, c uses the encryption algorithm f to obtain $c=(c_1, c_2, \ldots c_i, \ldots c_n)$, $c_i=f(W_{key}, b_i)=b_i+s*r+s*\tau_1 \Sigma x_i*r \mod x_0$, where r is a random number.

Decryption algorithm (Dec): The working key $W_{key}$ generated by KeyGen is used for the input ciphertext data c, $b'=Dec(W_{key}, c_i)$, b' uses the decryption algorithm f' to obtain $b'=(b_1', b_2', \ldots, b_i', \ldots, b_n')$, where $b'=f'(W_{key}, c_i)=(c_i \mod p) \mod s$, $1 \leq i \leq n$, and b' of the base s is converted into plaintext m.

Ciphertext operation (CO): The working key $W_{key}$ generated by KeyGen is used for the two input ciphertext data $c_1$ and $c_2$, $c'=CO(W_{key}, c_1 \, O \, c_2)$, c' uses a constructed ciphertext operation function f' for calculation to obtain $c'=(c_1', c_2', \ldots, c_i', \ldots, c_n')$ $$c_i''=f''(W_{key}, c_{1i}'Oc_{2i}')$$

Where: $1 \leq i \leq n$, $O \in \{+, -, *, /, \ldots\}$

The ciphertext operation function f″ is constructed to implement ciphertext computation. The ciphertext computation process derives the following judgment rule based on the encryption algorithm f.

Take s=2 binary as an example: assuming $$c_1 = m_1 + 2*r_1 + p*r_1 \bmod x_0;$$

$$c_2 = m_2 + 2*r_2 + p*r_2 \bmod x_0;$$

$$c = c_1 + c_2 = (m_1 + m_2) + 2*r_1 + p*r_1 + 2*r_2 + p*r_2 =$$

$$(m_1 + m_2) + 2*(r_1 + r_2) + p*(r_1 + r_2)$$

$$c = c_1 * c_2 = (m_1 + 2*r_1 + p*r_1)(m_2 + 2*r_2 + p*r_2) =$$

$$m_1*m_2 + m_1*2*r_2 + m_1*p*r_2 + 2*r_1*m_2 + 2*r_1*2*r_2 +$$

$$2*r_1*p*r_2 + p*r_1*m_2 + p*r_1*2*r_2 + p*r_1*p*r_2 =$$

$$m_1*m_2 + 2*(m_1*r_2 + m_2*r_1 + 2*r_1*r_2) +$$

$$p*(m_1*r_2 + 4*r_1*r_2 + r_1*m_2 + r_1*p*r_2)$$

After the ciphertext c is subjected to mod p, the addition and multiplication noise formulas for the ciphertext calculation are as follows:

$$c=(c_1+c_2)\bmod p=(m_1+m_2)+2(r_1+r_2) \qquad (1)$$

$$c=(c_1*c_2)\bmod p=m_1*m_2+2*(m_1*r_2+m_2*r_1+2*r_1*r_2) \qquad (2)$$

When the plaintext $(m_1=0, m_2=0)$, $(m_1=0, m_2=1)$, $(m_1=1, m_2=0)$, $(m_1=1, m_2=1)$:

the judgment rule of the ciphertext calculation for addition is:

$c=0+2(r_1+r_2)$; (c mod p) mod 2=0; decryption is correct
$c=1+2(r_1+r_2)$; (c mod p) mod 2=1; decryption is correct
$c=1+2(r_1+r_2)$; (c mod p) mod 2=1; decryption is correct
$c=2+2(r_1+r_2)$; (c mod p) mod 2=0; decryption is wrong the judgment rule of the ciphertext calculation for multiplication is:

$c=0+4r_1r_2$; (c mod p) mod 2=0; decryption is correct
$c=0+2(r_1+2r_1r_2)$; (c mod p) mod 2=0; decryption is correct
$c=0+2(r_2+2r_1r_2)$; (c mod p) mod 2=0; decryption is correct
$c=1+2(r_1+r_2+2r_1r_2)$; (c mod p) mod 2=1; decryption is correct Based on the above analysis, it can be seen from the noise formula (1) that when the plaintext $(m_1=1, m_2=1)$, the ciphertext result acquired when the ciphertext addition calculation is performed is wrong, that is, an error will inevitably occur in decryption. It can be seen from the noise formula (2) that the product of the two ciphertexts causes the noise to increase exponentially, and once the result after being subjected to modulo p is not in the range of $(-p/s, p/s)$, and the decryption will also inevitably go wrong. After the rule is grasped, two circuit functions are constructed as follows.

1, the circuit function $f_1$

Function description: binary ciphertext calculation is performed to solve the noise problem in ciphertext calculation.

Input parameters: the working key $W_{key}$ is $(X_0, p)$, the ciphertext is $c_1$, $c_2$, and the operator is op.

Output parameters: the calculated ciphertext c is returned, the carry flag is returned, 1 represents carry, and 0 represents no carry.

The ciphertext calculation steps are as follows:

Step 1: initializing c=0, flag=0.

Step 2: proceeding to step 3 if op is equal to add, multiplying the ciphertexts, $c=c_1*c_2$, and proceeding to step 4 if not.

Step 3: judging whether the two ciphertexts (($c_1$ mod p) mod 2) and (($c_2$ mod p) mod 2) are true, and the ciphertexts are added, c=c1+c2, flag=1 if so.

Step 4: returning to refresh the ciphertext c and the carry flag.

2, the circuit function $f_2$

Function description: the size of the binary ciphertext is judged to solve whether to continue subtraction when the ciphertext division calculation is performed.

Input parameters: the working key $W_{key}$ is $(X_0, p)$, and the ciphertext is $c_1$, $c_2$.

Output parameters: the flag of the returned result is true if c1≥c2, and the flag is false if not.

The ciphertext calculation steps are as follows:

Step 1: initializing flag=false.

Step 2: judging whether the two ciphertexts (($c_1$ mod p) mod 2)≥(($c_2$ mod p) mod 2) are true, flag=true if true.

Step 3: returning the value of flag.

As shown in FIG. 1, the fully homomorphic encryption method based on modular operation of the disclosure comprises the following steps.

(1) The plaintext of any numerical value data type is acquired in the encryption process and is converted to the corresponding plaintext system plaintext according to the encryption requirement. For example, In Example 1, the two plaintexts are $m_1=5$, $m_2=3$, respectively, and need to be subjected to binary bit encryption, respectively, and the resulting binary plaintexts are 101 and 011, respectively;

In Example 2, the two plaintexts are $m_1=7$ and $m_2=3$, respectively, and need to be subjected to binary bit encryption, respectively, and the resulting binary plaintexts are 111 and 011, respectively;

In Example 3, the two plaintexts are $m_1=7$ and $m_2=2$, respectively, and need to be subjected to binary bit encryption, respectively, and the resulting binary plaintexts are 111 and 010, respectively.

(2) An encryption operation is performed on each number in the system plaintext acquired in (1), and the ciphertexts acquired by the encryption operation are combined to obtain a corresponding ciphertext combination. Specifically, the encryption operation uses the following formula:

$$c=(m+s*r+p*q)\bmod x_0$$

Where c represents a ciphertext, m represents a system digit in a plaintext, s represents a system used in encryption (for example, if it is binary, s=2; if it is hexadecimal, s=16), r represents a random number, p is an encryption key, and $x_0$ is an intermediate variable, which is equal to the product of the encryption key p and another encryption key q (where both p and q are odd numbers). These keys described above are not publicly disclosed.

For example, assuming that the working key p=111, q=11, $x_0$=p*q=1221, and r=1, for the numbers 0 and 1 in the binary plaintext 101 of the plaintext 5 and the binary plaintext 3 of the plaintext 3, the following result may be obtained after calculation using the above formula of this step:

the ciphertext after the number 0 is encrypted is equal to 113;

the ciphertext after the number 1 is encrypted is equal to 114.

For example,

In Example 1: the binary plaintext of the plaintext 5 is 101, and the encrypted ciphertext combination becomes $c_1$=(114, 113, 114); the binary plaintext of the plaintext 3 is 011, and the encrypted ciphertext becomes c2=(113, 114, 114);

In Example 2: the binary plaintext of the plaintext 7 is 111, and the encrypted ciphertext combination becomes $c_1$=(114, 114, 114); the binary plaintext of the plaintext 3 is 011, and the encrypted ciphertext becomes $c_2$=(113, 114, 114);

In Example 3: the binary plaintext of the plaintext 7 is 111, and the encrypted ciphertext combination becomes $c_1$=(114, 114, 114); the binary plaintext of the plaintext 2 is 010, and the encrypted ciphertext becomes $c_2$=(113, 114, 113).

Figure 2:
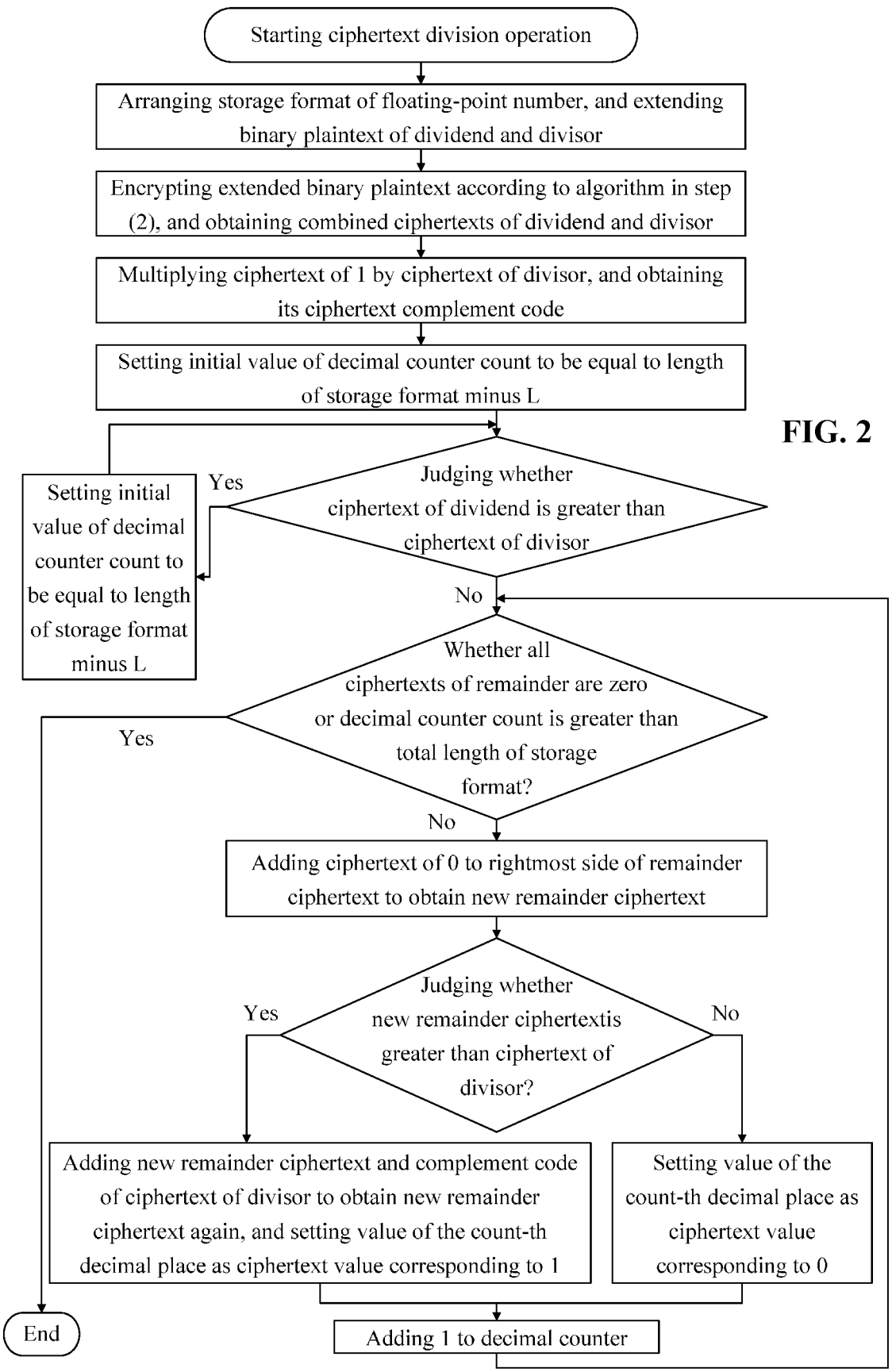
FIG. 2 is a flowchart illustrating a process of performing ciphertext division calculation in the method according to the disclosure.

(3) A ciphertext operation is performed on the ciphertext combination acquired in (2) using a ciphertext source code, a ciphertext radix-minus-one complement, and a ciphertext complement code based on modular encryption; as shown in FIG. 2, this step specifically comprises the following substeps.

(3-1) For the ciphertext addition operation, two ciphertexts are directly combined to perform the alignment summation operation.

For the above example, namely:

in Example 1: $c_1+c_2$=(114, 113, 114)+(113, 114, 114);
in Example 2: $c_1+c_2$=(114, 114, 114)+(113, 114, 114);
in Example 3: $c_1+c_2$=(114, 114, 114)+(113, 114, 113).

In the ciphertext addition operation, the corresponding ciphertext of each bit of the ciphertext is first obtained according to a decryption formula (ciphertext mod p) mod s, and the obtained plaintext is summed and added bitwise. Then it is judged whether the value obtained by summing each bit is equal to the system, it indicates that a carry occurs if so, a carry value (that is, 1) is returned at this time, the result of the summation of a ciphertext bit is returned (i.e., the ciphertext summation result is refreshed), and 1 is added in the summation process of the previous bit of the ciphertext bit; and it indicates that no carry occurs if not, a carry value (i.e., 0) and the result of the summation of a ciphertext bit are returned at this time, and 0 is added in the summation process of the previous bit of the ciphertext bit.

In the following ciphertext subtraction, multiplication, and division operations, there will be cases of addition carry. The processing method is exactly the same as the above carry process, and will not be described below.

In Example 1: $c_1+c_2$=(114, 228, 228, 228)
In Example 2: $c_1+c_2$=(114, 228, 229, 228)
In Example 3: $c_1+c_2$=(114, 228, 228, 227)

The ciphertext calculation is verified to be correct with the decryption algorithm m=(c mod p) mod 2, for example, in Example 1: the decrypted ciphertext $c_1+c_2$ calculation result: (114, 228, 228, 228)=(1000)=8 in Example 2: the decrypted ciphertext $c_1+c_2$ calculation result: (114, 228, 229, 228)=(1010)=10 in Example 3: the decrypted ciphertext $c_1+c_2$ calculation result: (114, 228, 228, 227)=(1001)=9

(3-2) For the ciphertext subtraction operation, a radix-minus-one complement of the ciphertext combination of the subtrahend is acquired first, then the corresponding complement code is acquired according to the radix-minus-one complement, and finally the alignment summation operation is performed on the complement code and the source code of the ciphertext combination of the minuend.

For the above example, namely:

first, the radix-minus-one complement of the ciphertext combination $c_2$ is acquired, which is specifically equal to the number of the system minus the system bit minus 1.

For $c_2$, the plaintext source code is 011, the radix-minus-one complement corresponding to the first bit 0 is 2-0-1=1, the radix-minus-one complement corresponding to the second bit 1 is 2-1-1=0, and the third bit is 2-1-1=0. Therefore, the radix-minus-one complement is 100, and the corresponding ciphertext radix-minus-one complement adds 1 to each bit of the ciphertext source code.

For example, in Example 1: $c_{2\ radix\text{-}minus\text{-}one\ complement}$=(114, 115, 115);
in Example 2: $c_{2\ radix\text{-}minus\text{-}one\ complement}$=(114, 115, 115);
in Example 3: $c_{2\ radix\text{-}minus\text{-}one\ complement}$=(114, 115, 114).

Then the complement code of the ciphertext combination $c_2$ is obtained by adding 1 to the last bit in the radix-minus-one complement:

in Example 1: $c_{2\ complement\ code}$=(114, 115, 116);
in Example 2: $c_{2\ complement\ code}$=(114, 115, 116);
in Example 3: $c_{2\ complement\ code}$=(114, 116, 115).

Finally, the source code of $c_1$ and the complement code of $c_2$ are added to obtain:

in Example 1: $c_1-c_2=c_{1\ source\ code}+c_{2\ complement\ code}$=(114, 113, 114)+(114, 115, 116)=(228, 229, 230)

in Example 2: $c_1-c_2=c_{1\ source\ code}+c_{2\ complement\ code}$=(114, 114, 114)+(114, 115, 116)=(229, 230, 230)

in Example 3: $c_1-c_2=c_{1\ source\ code}+c_{2\ complement\ code}$=(114, 114, 114)+(114, 116, 115)=(229, 230, 229)

It should be noted that in the above ciphertext calculation process, there will be cases of carry. The ciphertext calculation is verified to be correct with the decryption algorithm m=(c mod p) mod 2, for example, in Example 1: the decrypted ciphertext $c_1-c_2$ calculation result: (228, 229, 230)=(010)=2;

in Example 2: the decrypted ciphertext $c_1-c_2$ calculation result: (229, 230, 230)=(100)=4;

in Example 3: the decrypted ciphertext $c_1-c_2$ calculation result: (229, 230, 229)=(101)=5.

(3-3) For the ciphertext multiplication operation, an n*(2n−1) matrix is first created based on the number n (n=3 in this embodiment) of elements in the ciphertext combination $c_1$ and $c_2$, wherein the elements in the first row of the matrix from right to left are: the product of the rightmost element in $c_1$ and the rightmost element in $c_2$, the product of the second last element on the right in $c_1$ and the rightmost element in $c_2$, and so on, and the product of the first element on the left in $c_1$ and the rightmost element in $c_2$, respectively; the elements in the second row of the matrix from right to left are: one 0, the product of the rightmost element in $c_1$ and the second last element on the right in $c_2$, the product of the second last element on the right in $c_1$ and the second last element on the right in $c_2$, and so on, and the product of the first element on the left in $c_1$ and the second last element on the right in $c_2$, respectively; . . . the elements in the nth row of the matrix from right to left are: (n−1) zeros, the product of the rightmost element in $c_1$ and the first element on the left in $c_2$, the product of the second last element on the right in $c_1$ and the first element on the left in $c_2$, and so on, and the product of the first element on the left in $c_1$ and the first element on the left in $c_2$, respectively.

Then, each column of the constructed matrix is summed to obtain a new row vector. The row vector is taken as the result of the ciphertext multiplication operation. For example, in Example 1: for the above example, $c_1$(114, 113, 114) is first multiplied by $c_2$(113, 114, 114) and a three-row five-column matrix is constructed according to the above rule as follows:

12996 12882 12996

12996 12882 12996 0

12882 12769 12882 0 0

Then, each column of the matrix is summed to obtain the following row vector:
(12882 25765 38770 25878 12996)
Finally, the row vector is taken as the result of the ciphertext multiplication operation, i.e., $c_1*c_2$=(12882, 25765, 38770, 25878, 12996).

in Example 2: for the above example, $c_1$(114, 114, 114) is first multiplied by $c_2$(113, 114, 114) and a three-row five-column matrix is constructed according to the above rule as follows:

12996 12882 12996

12996 12996 12996 0

12882 12882 12882 0 0

Then, each column of the matrix is summed to obtain the following row vector:
(12883 25879 38875 25992 12996)
Finally, the row vector is taken as the result of the ciphertext multiplication operation, i.e., $c_1*c_2$=(12883, 25879, 38875, 25992, 12996).

in Example 3: for the above example, $c_1$(114, 114, 114) is first multiplied by $c_2$(113, 114, 113) and a three-row five-column matrix is constructed according to the above rule as follows:

12882 12882 12882

12996 12996 12996 0

12882 12882 12882 0 0

Then, each column of the matrix is summed to obtain the following row vector:
(12882 25878 38760 25878 12882)
Finally, the row vector is taken as the result of the ciphertext multiplication operation, i.e., $c_1*c_2$=(12882, 25878, 38760, 25878, 12882).

It should be noted that in the above ciphertext calculation process, there will be cases of carry. The ciphertext calculation is verified to be correct with the decryption algorithm m=(c mod p) mod 2, for example,
in Example 1: the decrypted ciphertext $c_1*c_2$ calculation result:
(12882, 25765, 38770, 25878, 12996)=(01111)=15;
in Example 2: the decrypted ciphertext $c_1*c_2$ calculation result:
(12883, 25879, 38875, 25992, 12996)=(10101)=21;
in Example 3: the decrypted ciphertext $c_1*c_2$ calculation result:
(12882, 25878, 38760, 25878, 12882)=(01110)=14.

(3-4) The ciphertext division operation comprises the following sub-steps.

(3.1) A storage format of an empty division operation result is created, which has a total length of 32 bits, 64 bits, or 80 bits conforming to the IEEE 754 standard, comprising a sign bit, an integer bit, and a decimal place, and extending the binary plaintext according to the storage format.

It should be noted that in the storage format, the first bit is a sign bit, which has a value equal to 0 or 1 used to represent a positive number and a negative number of the ciphertext, respectively; the length of the integer bit also conforms to the IEEE 754 standard and is denoted as L; then the length of the remaining decimal place is (the total length of the storage format minus L), as shown in the following format specifically:

| Sign bit (1 bit) | Integer bit (a length of L) $x_1, x_2, x_3, \ldots x_L$ | Decimal place (its length is the total length of the storage format minus L) $y_1, y_2, y_3, \ldots$ $y_{\text{the total length of the storage format minus } L}$ |
|---|---|---|

The purpose of using this storage format is to calculate the integer part and the decimal part of the quotient of the division operation, respectively, where the integer part of the quotient is equal to $x_L*2_0+x_{L-1}*2^1+ \ldots +x_1*2^{L-1}$, where x denotes the ciphertext value in the integer part.

The decimal part of the quotient is equal to:

$$y_1*2_{-1}+y_2*2^{-2}++y_{\text{the total length of the storage format minus } L}*2^{\text{the total length of the storage format minus } L},$$

where y represents the ciphertext value in the decimal part.

For example, for the simplicity of illustration and convenience of description, the storage format length of 8 bits is used as an example to illustrate: the first bit from left to right is a sign bit, the second to fourth bits are integer bits, and the fifth to eighth bits are decimal places. The binary plaintext obtained in (1) is extended, the length of the extended plaintext is 8 bits, and the extension bits are all filled with the digit 0. For example,
in Example 1: the binary plaintext 101 in (1) is extended to 00000101, and the binary plaintext 011 is extended to 00000011;
in Example 2: the binary plaintext 111 in (1) is extended to 00000111, and the binary plaintext 011 is extended to 00000011;
in Example 3: the binary plaintext 111 in (1) is extended to 00000111, and the binary plaintext 010 is extended to 00000010.

(3.2) An encryption operation is performed on the extended binary plaintext according to the algorithm in (2), and the encryption operation results are combined to obtain the corresponding ciphertexts as the dividend and the divisor, respectively. For example,
in Example 1: the above extended plaintext 00000101 and 00000011 have been changed to (113, 113, 113, 113, 113, 114, 113, 114) (00000101) and (113, 113, 113, 113, 113, 113, 114, 114) (00000011) after being subjected to the operation of this process;
in Example 2: the above extended plaintext 00000111 and 00000011 have been changed to (113, 113, 113, 113, 113, 114, 114, 114) (00000111) and (113, 113, 113, 113, 113, 113, 114, 114) (00000011) after being subjected to the operation of this process;
in Example 3: the above extended plaintext 00000111 and 00000010 have been changed to (113, 113, 113, 113, 113, 114, 114, 114) (00000111) and (113, 113, 113, 113, 113, 113, 114, 113) (00000010) after being subjected to the operation of this process.

(3.3) The ciphertext of 1 obtained in (2) is multiplied by the ciphertext as a divisor. For example, in Example 1: the ciphertext 114 is multiplied by (113, 113, 113, 113, 113, 113, 114, 114) (00000011) to obtain the ciphertext combination (12882, 12882, 12882, 12882, 12882, 12882, 12996, 12996) (00000011). The ciphertext complement code is obtained on the product. The step of obtaining the ciphertext complement code is exactly the same as the above step (3-2). After the complement code is obtained on the product, the obtained ciphertext combination is (12883, 12883, 12883, 12883, 12883, 12883, 12997, 12998) (11111101); the ciphertext complement code in Example 2 is the same as in Example 1.

in Example 3: the ciphertext 114 is multiplied by (113, 113, 113, 113, 113, 113, 114, 113) (00000010) to obtain the ciphertext combination (12882, 12882, 12882, 12882, 12882, 12882, 12996, 12882) (00000010). The ciphertext complement code is obtained on the product. The step of obtaining the ciphertext complement code is exactly the same as the above step (3-2). After the complement code is obtained on the product, the obtained ciphertext combination is (12883, 12883, 12883, 12883, 12883, 12883, 12998, 12884) (11111110).

(3.4) The initial value of the decimal counter count is set to be equal to (the length of the storage format minus L).

(3.5) It is judged whether the ciphertext of the dividend is greater than the ciphertext of the divisor, proceeding to (3.6) if greater than the ciphertext, and proceeding to (3.7) if not.

Specifically, judging whether the ciphertext of the dividend is greater than the ciphertext of the divisor is to judge whether each bit in the dividend is greater than or equal to the corresponding bit in the divisor in a traversing manner from left to right. If there is one bit less than the corresponding bit in the divisor, it indicates that the ciphertext of the dividend is not a ciphertext greater than the divisor.

(3.6) The ciphertext of the dividend and the complement code of the ciphertext of the divisor in (3.3) are added to obtain the remainder as a new dividend, and the ciphertexts of 1 are added in the integer bit to obtain the ciphertext quotient, returning to (3.5).

For example, in Example 1: the remainder ciphertext calculated in the first cycle=dividend ciphertext+divisor ciphertext complement code=(113,113,113,113,113,114,113,114) (00000101)+(12883, 12883, 12883, 12883, 12883, 12883, 12997, 12998) (11111101)=(12997, 12997, 12997, 12997, 12997, 12997, 13111, 13112) (00000010). It should be noted that there will be cases of carry in the process of summation. Proceed to (3.5) after the remainder ciphertext is obtained;

in Example 2: the remainder ciphertext calculated in the first cycle=dividend ciphertext+divisor ciphertext complement code=(113, 113, 113, 113, 113, 114, 114, 114) (00000111)+(12883, 12883, 12883, 12883, 12883, 12883, 12997, 12998) (11111101)=(12997, 12997, 12997, 12997, 12997, 12998, 13112, 13112) (00000100). It should be noted that there will be cases of carry in the process of summation. Proceed to (3.5) after the remainder ciphertext is obtained.

The remainder cyphertext calculated in the second cycle= (12997, 12997, 12997, 12997, 12997, 12998, 13112, 13112) (00000100)+(12883, 12883, 12883, 12883, 12883, 12883, 12997, 12998) (11111101)=(25881, 25881, 25881, 25881, 25881, 25881, 26109, 26110) (00000001).

In Example 3: the remainder ciphertext calculated in the first cycle=dividend ciphertext+divisor ciphertext complement code=(113, 113, 113, 113, 113, 114, 114, 114) (00000111)+(12883, 12883, 12883, 12883, 12883, 12883, 12998, 12884) (11111110)=(12997, 12997, 12997, 12997, 12997, 12998, 13112, 12998) (00000101). It should be noted that there will be cases of carry in the process of summation. Proceed to (3.5) after the remainder ciphertext is obtained;

The remainder ciphertext calculated in the second cycle= (12997, 12997, 12997, 12997, 12997, 12998, 13112, 12998) (00000101)+(12883, 12883, 12883, 12883, 12883, 12883, 12998, 12884) (11111110)=(25881, 25881, 25881, 25881, 25881, 25881, 26110, 25882) (00000011)

The remainder ciphertext calculated in the third cycle= (25881, 25881, 25881, 25881, 25881, 25881, 26110, 25882) (00000011)+(12883, 12883, 12883, 12883, 12883, 12883, 12998, 12884) (11111110)=(38765, 38765, 38763, 38765, 38765, 38765, 39108, 38766) (00000001)

(3.7) It is judged whether all the ciphertexts of the remainder are zero or the decimal counter count is greater than the total length of the storage format, proceeding to (3.8) if not; ending the ciphertext division operation and proceeding to (3.13) to obtain the result of the ciphertext division operation if so.

(3.8) The ciphertext of 0 is added to the rightmost side of the remainder ciphertext to obtain a new remainder ciphertext, proceeding to (3.9). For example, in Example 1: the new remainder ciphertext obtained in the first cycle is (12997, 12997, 12997, 12997, 12997, 13111, 13112, 113) (00000100);

in Example 2: the new remainder ciphertext obtained in the first cycle is (25881, 25881, 25881, 25881, 25881, 26109, 26110, 113) (000000010);

The new remainder ciphertext obtained in the second cycle is (25881, 25881, 25881, 25881, 26109, 26110, 113, 113) (0000000100);

in Example 3: the new remainder ciphertext obtained in the first cycle is (38765, 38763, 38765, 38765, 38765, 39108, 38766, 113) (00000010).

(3.9) It is judged whether the new remainder ciphertext obtained in (3.8) is greater than the ciphertext of the divisor, proceeding to (3.10) if so, and proceeding to (3.11) if not.

(3.10) The new remainder ciphertext and the complement code of the ciphertext of the divisor are added to obtain a new remainder ciphertext again, and the value of the count-th decimal place is set as a ciphertext value corresponding to 1. For example, the ciphertext of 1 is 114, and then proceed to (3.12). For example, in Example 1: the updated remainder ciphertext=the new remainder ciphertext+the divisor ciphertext complement code=(12997, 12997, 12997, 12997, 12997, 13111, 13112, 113) (00000100)+(12883, 12883, 12883, 12883, 12883, 12883, 12997, 12998) (11111101)=(25881, 25881, 25881, 25881, 25881, 25994, 26109, 13111) (00000001);

in Example 2: the updated remainder ciphertext=the new remainder ciphertext+the divisor ciphertext complement code=(25881, 25881, 25881, 25881, 26109, 26110, 113, 113) (0000000100)+(12883, 12883, 12883, 12883, 12883, 12883, 12997, 12998) (11111101)=(38765, 38765, 38765, 38765, 38993, 38993, 13110, 13111) (00000001);

in Example 3: the updated remainder ciphertext=the new remainder ciphertext+the divisor ciphertext complement code=(38765, 38763, 38765, 38765, 38765, 39108, 38766, 113) (00000010)+(12883, 12883, 12883, 12883, 12883, 12998, 12884) (11111110)=(51649, 51649, 51649, 51649, 51649, 51992, 51764, 12997) (00000000).

(3.11) The value of the count-th decimal place is set as the ciphertext value corresponding to 0, for example, the ciphertext of 0 is 113, and then proceed to (3.12).

(3.12) 1 is added to the decimal counter, and then return to (3.7).

(3.13) The integer part and the decimal part of the quotient are acquired according to the obtained ciphertext value, and the integer part and the decimal part are stored according to the storage format in (3.1). For example, in Example 1: the integer part executes step (3.6) and records the ciphertext value of the next bit as 114. Since this example is a number that cannot be divisible, it is until the decimal place is full, i.e., the decimal counter is greater than the total length of the storage format so that the ciphertext division operation ends, i.e., the decimal part executes steps (3.10), (3.11), (3.10), (3.11) in the cycle process. The ciphertexts recorded at the 5th to 8th bits of the decimal place are 114, 113, 114 and 113, respectively, i.e., the ciphertext value of the quotient is (113, 113, 113, 114, 114, 113, 114, 113).

in Example 2: the integer part executes step (3.6) twice circularly, records the ciphertext value of the next bit as 114 in the fourth bit of the integer bit at the first time, and adds the ciphertext value 114 in the fourth bit of the integer bit at the second time. Therefore, the ciphertext values of the integer bit are 113, 114, and 228. Since this example is a number that cannot be divisible, it is until the decimal place is full, i.e., the decimal counter is greater than the total length of the storage format so that the ciphertext division operation ends, i.e., the decimal part executes steps (3.10), (3.11), (3.10), (3.11) in the cycle process. The ciphertext values recorded at the 5th to 8th bits of the decimal place are 114, 113, 114 and 113, respectively, i.e., the ciphertext value of the quotient is (113, 113, 114, 228, 113, 114, 113, 114).

in Example 3: the integer part executes step (3.6) for three times circularly, records the ciphertext value of the next bit as 114 in the fourth bit of the integer bit at the first time, and adds the ciphertext value 114 in the fourth bit of the integer bit at the second time. Therefore, the ciphertext values of the integer bit are 113, 114, and 228. The ciphertext value 114 is added in the fourth bit of the integer bit at the third time. Therefore, the ciphertext values of the integer bit are 113, 114, and 342. Since this example is a number that cannot be divisible, all the ciphertexts of the remainder are zero so that the ciphertext division operation ends, i.e., the decimal part executes step (3.10) in the cycle process. The ciphertext value recorded in the fifth bit of the decimal place is 114, i.e., the ciphertext value of the quotient is (113, 113, 114, 342, 114, 113, 113, 113).

The result obtained in the above ciphertext calculation process is consistent with the result of the plaintext calculation, for example, in Example 1:
$c_1/c_2 = 5/3 = $(113, 113, 113, 113, 113, 114, 113, 114) (00000101)/(113, 113, 113, 113, 113, 113, 114, 114) (00000011)=(113, 113, 113, 114, 114, 113, 114, 113).

in Example 2:
$c_1/c_2 = 7/3 = $(113, 113, 113, 113, 113, 114, 114, 114) (00000111)/(113, 113, 113, 113, 113, 113, 114, 114) (00000011)=(113, 113, 114, 228, 113, 114, 113, 114).

in Example 3:
$c_1/c_2 = 7/2 = $(113, 113, 113, 113, 113, 114, 114, 114) (00000111)/(113, 113, 113, 113, 113, 113, 114, 114) (00000010)=(113, 113, 114, 342, 114, 113, 113, 113).

It should be noted that in the above ciphertext calculation process, there will be cases of carry. The ciphertext calculation is verified to be correct with the decryption algorithm m=(c mod p) mod 2, for example, in Example 1: the decrypted ciphertext $c_1/c_2$ calculation result: (113, 113, 113, 114, 114, 113, 114, 113)=(00011010)= 1.625

Note: Since the floating-point number in this example has only 4 decimal places, the result is 1.625; if the decimal place is represented by 7 bits, the result is 1.664063, which indicates that the precision of the decimal place is related to the length of the reserved decimal places.

in Example 2: the decrypted ciphertext $c_1/c_2$ calculation result: (113, 113, 114, 228, 113, 114, 113, 114)= (00100101)= 2.3125

Note: Since the floating-point number in this example has only 4 decimal places, the result is 2.3125; if the decimal place is represented by 8 bits, the result is 2.332031, which indicates that the precision of the decimal place is related to the length of the reserved decimal places.

in Example 3: the decrypted ciphertext $c_1/c_2$ calculation result: (113, 113, 114, 342, 114, 113, 113, 113)=(00111000)= 3.5

The above ciphertext calculation results show that the decrypted ciphertext calculation result of adding, subtracting, multiplying, and dividing of ciphertexts after the two plaintext are encrypted is the same as the plaintext calculation result.

(4) The modular division is configured to decrypt the result of the ciphertext operation acquired in (3) to obtain the decrypted plaintext; specifically, the following formula is used: (c mod p) mod s.

For all the examples mentioned in the above steps, since the following decryption processes and results are described in detail at the end of the encryption operations of addition, subtraction, multiplication, and division, the examples are not described separately in this step.

The fully homomorphic encryption method based on mode operation of the disclosure can be implemented by a fully homomorphic encryption circuit. The fully homomorphic encryption circuit is a field-programmable gate array built in a configuration file (In-System Flash FPGA, ISF FPGA in short).

Figure 3:
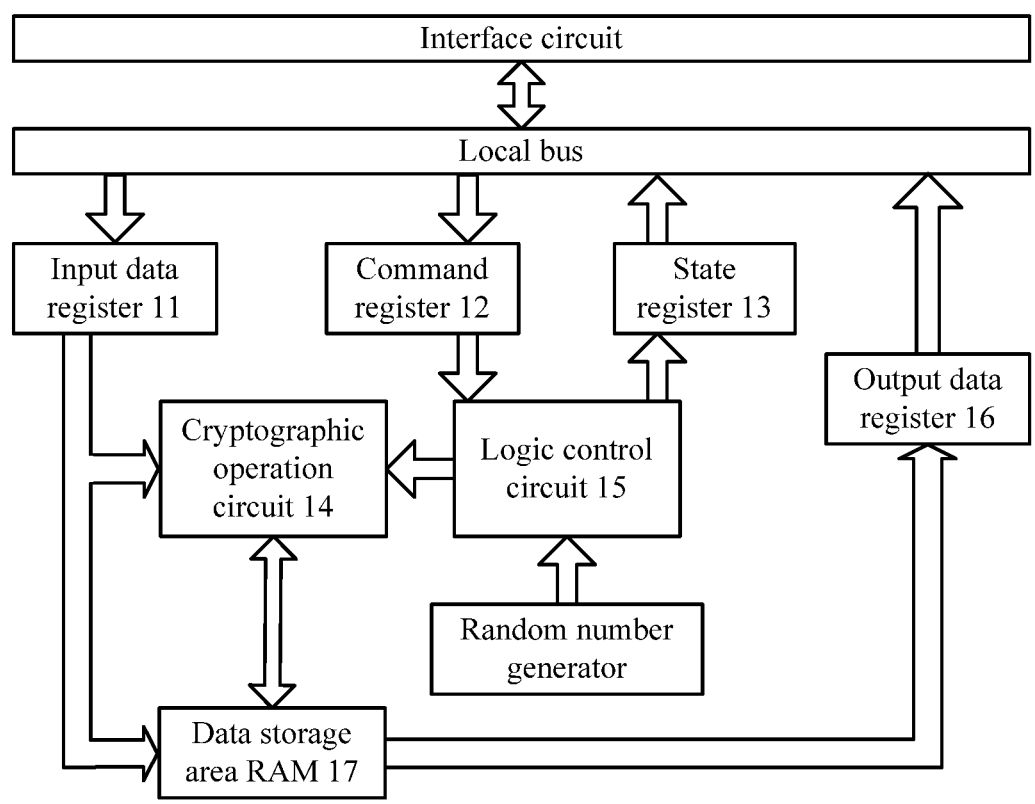
FIG. 3 is a circuit diagram for implementing a fully homomorphic encryption method based on modular operation according to the disclosure.

As shown in FIG. 3, the fully homomorphic encryption circuit 1 comprises an input data register 11, a command register 12, a state register 13, a cryptographic operation circuit 14, a logic control circuit 15, an output data register 16, and a data storage area RAM 17.

The input data register 11 is configured to obtain the processed data and private data, transmits the processed data to the cryptographic operation circuit 14, and stores the private data in the data storage area RAM 17 for the cryptographic operation circuit 14.

The cryptographic operation circuit 14 is configured to obtain private data from the data storage area RAM 17.

The command register 12 is configured to obtain user commands from the local bus and transmit the user commands to the logic control circuit 15.

The logic control circuit 15 is configured to control the cryptographic operation circuit 14 to perform the encryption and decryption function and the ciphertext operation function according to the user commands, and transmit the result to the state register 13, in which the random number used in the encryption process is generated by a random number generator.

The state register 13 is configured to obtain an execution result from the logic control circuit 15 and transmit the execution result via the local bus to the interface circuit.

The data storage area RAM 17 is configured to transfer data processed by the cryptographic operation circuit 14 to the output data register 16.

The output data register 16 receives data from the data storage area RAM 17 and transmits the data to the local bus.

The fully homomorphic encryption circuit realizes the encryption and decryption of positive and negative integers and various types of real numbers, and can perform various arithmetic operations, relation comparison operations and logic operations in the dense state, so the information protection for users can be realized. In addition, the fully homomorphic encryption circuit can directly perform data calculation and processing on the ciphertext data in the dense state. This technology can provide the data processing parties with the business opportunities for the analysis and mining of ciphertext data and the storage of massive data, so that the cloud computing service providers can accept the entrustment of data owners and safely and adequately analyze and process data without exposing the original data.

It will be obvious to those skilled in the art that changes and modifications may be made, and therefore, the aim in the appended claims is to cover all such changes and modifications.

What is claimed is:

1. A method of using a homomorphic encryption system to encrypt and decrypt a plaintext, the homomorphic encryption system comprising a logic control circuit and a cryptographic operation circuit, the cryptographic operation circuit being connected to the logic control circuit and comprising an acquiring module, an encryption operation module, a cryptographic operation module, and a decryption module, the method comprising:
(1) activating the logic control circuit to control the acquiring module in the cryptographic operation circuit to acquire a plaintext of any numerical value data type in an encryption process and to convert the plaintext to a corresponding plaintext system plaintext according to an encryption requirement;
(2) activating the logic control circuit to control the encryption operation module in the cryptographic operation circuit to perform an encryption operation on each number in the system plaintext acquired in (1), and to combine ciphertexts acquired by the encryption operation to obtain a corresponding ciphertext combination;
(3) activating the logic control circuit to control the cryptographic operation module in the cryptographic operation circuit to perform a ciphertext operation on the ciphertext combination acquired in (2) using a ciphertext source code, a ciphertext radix-minus-one complement, and a ciphertext complement code based on modular encryption; and
(4) activating decryption module to control the decryption module to use modular division to decrypt a result of the ciphertext operation acquired in (3) to obtain a decrypted plaintext;

wherein:
the encryption operation in (2) uses the following formula:

$$c=(m+s*r+p*q) \bmod x_0;$$

c represents a ciphertext, m represents a system digit in a plaintext, s represents a system used in encryption, r represents a random number, p is an encryption key, and $x_0$ is an intermediate variable which is equal to a product of the encryption key p and another encryption key q; and the keys are not publicly disclosed;
(4) uses the following formula: (c mod p) mod s; and
in (3), for a ciphertext subtraction operation, a radix-minus-one complement of the ciphertext combination of the subtrahend is acquired first, then the corresponding complement code is acquired according to the radix-minus-one complement, and finally an alignment summation operation is performed on the complement code and the source code of the ciphertext combination of the minuend.

2. The method of claim 1, wherein in (3), for a ciphertext multiplication operation, an n*(2n−1) matrix is first created based on the number n of elements in the ciphertext combination $c_1$ and $c_2$, the elements in the first row of the matrix from right to left are: the product of the rightmost element in $c_1$ and the rightmost element in $c_2$, the product of the second last element on the right in $c_1$ and the rightmost element in $c_2$, and so on, and the product of the first element on the left in $c_1$ and the rightmost element in $c_2$, respectively; the elements in the second row of the matrix from right to left are: one 0, the product of the rightmost element in $c_1$ and the second last element on the right in $c_2$, the product of the second last element on the right in $c_1$ and the second last element on the right in $c_2$, and so on, and the product of the first element on the left in $c_1$ and the second last element on the right in $c_2$, respectively; and elements in the n-th row of the matrix from right to left are: (n−1) zeros, the product of the rightmost element in $c_1$ and the first element on the left in $c_2$, the product of the second last element on the right in $c_1$ and the first element on the left in $c_2$, and so on, and the product of the first element on the left in $c_1$ and the first element on the left in $c_2$, respectively; then, each column of the constructed matrix is summed to obtain a new row vector; the row vector is taken as the result of the ciphertext multiplication operation; finally, the row vector is taken as the result of the ciphertext multiplication operation.

3. The method of claim 1, wherein in (3), a ciphertext division operation comprises:
(3.1) creating a storage format of an empty division operation result, which has a total length of 32 bits, 64 bits, or 80 bits, comprising a sign bit, an integer bit, and a decimal place, and extending the binary plaintext according to the storage format;
(3.2) performing an encryption operation on the extended binary plaintext according to the algorithm in (2), and combining the encryption operation results to obtain the corresponding ciphertexts as the dividend and the divisor, respectively;
(3.3) multiplying the ciphertext of 1 obtained in (2) by the ciphertext as a divisor;
(3.4) setting the initial value of the decimal counter count to be equal to the length of the storage format minus L, where L is the length of the integer bit in the storage format;
(3.5) judging whether the ciphertext of the dividend is greater than the ciphertext of the divisor, proceeding to (3.6) if greater than the ciphertext, and proceeding to (3.7) if not;
(3.6) adding the ciphertext of the dividend and the complement code of the ciphertext of the divisor in (3.3) to obtain the remainder as a new dividend, and adding the ciphertexts of 1 in the integer bit to obtain the ciphertext quotient, and returning to (3.5);
(3.7) judging whether all the ciphertexts of the remainder are zero or the decimal counter count is greater than the total length of the storage format, proceeding to (3.8) if not; ending the ciphertext division operation and proceeding to (3.13) to obtain the result of the ciphertext division operation if so;
(3.8) adding the ciphertext of 0 to the rightmost side of the remainder ciphertext to obtain a new remainder ciphertext, and proceeding to (3.9);

(3.9) judging whether the new remainder ciphertext obtained in (3.8) is greater than the ciphertext of the divisor, proceeding to (3.10) if so, and proceeding to (3.11) if not;

(3.10) adding the new remainder ciphertext and the complement code of the ciphertext of the divisor to obtain a new remainder ciphertext again, and setting the value of the count-th decimal place as a ciphertext value corresponding to 1;

(3.11) setting the value of the count-th decimal place as the ciphertext value corresponding to 0, and then proceeding to (3.12);

(3.12) adding 1 to the decimal counter, and then returning to (3.7); and (3.13) acquiring the integer part and the decimal part of the quotient according to the obtained ciphertext value, and storing the integer part and the decimal part according to the storage format in (3.1).

4. The method of claim 3, wherein
an integer part of the quotient is equal to:
$x_L*2^0 + x_{L-1}*2^1 + \ldots + x_1*2^{L-1}$, where x represents the ciphertext value in the integer part; and
a decimal part of the quotient is equal to:
$y_1*2^{-1} + y_2*2^{-2} + \ldots + y^{total\ length\ of\ the\ storage\ format}{-}L * 2^{total\ length\ of\ the\ storage\ format-L}$, where y represents the ciphertext value in the decimal part.

5. The method of claim 3, wherein (3.5) is implemented as follows: judging whether the ciphertext of the dividend is greater than the ciphertext of the divisor is to judge whether each bit in the dividend is greater than or equal to the corresponding bit in the divisor in a traversing manner from left to right; if there is one bit less than the corresponding bit in the divisor, it indicates that the ciphertext of the dividend is not a ciphertext greater than the divisor.

6. The method of claim 3, wherein in the ciphertext addition operation, the corresponding ciphertext of each bit of the ciphertext is first obtained according to a decryption formula (ciphertext mod p) mod s, and the obtained plaintext is summed and added bitwise; then to judge whether the value obtained by summing each bit is equal to the system, it indicates that a carry occurs if so, a carry value is returned at this time, the result of the summation of a ciphertext bit is returned, and 1 is added in the summation process of the previous bit of the ciphertext bit; and it indicates that no carry occurs if not, a carry value and the result of the summation of a ciphertext bit are returned at this time, and 0 is added in the summation process of the previous bit of the ciphertext bit.

7. A homomorphic encryption system, comprising an input data register, a command register, a state register, a cryptographic operation circuit, a logic control circuit, an output data register, and a data storage area RAM, wherein:

the input data register is configured to obtain processed data and private data, transmit the processed data to the cryptographic operation circuit, and store the private data in the data storage area RAM for the cryptographic operation circuit;

the cryptographic operation circuit comprises an acquiring module, an encryption operation module, a cryptographic operation module, and a decryption module and is configured to obtain private data from the data storage area RAM;

the command register is configured to obtain user commands from a local bus and transmit the user commands to the logic control circuit;

the logic control circuit is configured to control the cryptographic operation circuit to perform an encryption process, a decryption process, and a ciphertext operation process according to the user commands, and transmit the result to the state register, in which a random number used in the encryption process is generated by a random number generator;

the state register is configured to obtain an execution result from the logic control circuit and transmit the execution result via the local bus to the interface circuit;

the data storage area RAM is configured to transfer data processed by the cryptographic operation circuit to the output data register; and the output data register is configured to receive data from the data storage area RAM and transmit the data to the local bus, the acquiring module is configured for acquiring a plaintext of any numerical value data type in an encryption process and converting the plaintext to a corresponding plaintext system plaintext according to an encryption requirement;

the encryption operation module is configured for performing an encryption operation on each number in the system plaintext acquired, and combining ciphertexts acquired by the encryption operation to obtain a corresponding ciphertext combination;

the cryptographic operation module is configured for performing a ciphertext operation on the ciphertext combination acquired in the encryption module using a ciphertext source code, a ciphertext radix-minus-one complement, and a ciphertext complement code based on modular encryption; and the decryption module is configured for using modular division to decrypt a result of the ciphertext operation acquired in the cryptographic module to obtain a decrypted plaintext;

the encryption operation in the encryption module uses the following formula:

$$c = (m + s*r + p*q) \bmod x_0,$$

c represents a ciphertext, m represents a system digit in a plaintext, s represents a system used in encryption, r represents a random number, p is an encryption key, and $x_0$ is an intermediate variable which is equal to a product of the encryption key p and another encryption key q; and the keys are not publicly disclosed;

the decryption module uses the following formula: (c mod p) mod s; and in the cryptographic module, for a ciphertext subtraction operation, a radix-minus-one complement of the ciphertext combination of the subtrahend is acquired first, then the corresponding complement code is acquired according to the radix-minus-one complement, and finally an alignment summation operation is performed on the complement code and the source code of the ciphertext combination of the minuend.

8. The system of claim 7, wherein in the cryptographic operation module, for a ciphertext multiplication operation, an n*(2n−1) matrix is first created based on the number n of elements in the ciphertext combination $c_1$ and $c_2$, the elements in the first row of the matrix from right to left are: the product of the rightmost element in $c_1$ and the rightmost element in $c_2$, the product of the second last element on the right in $c_1$ and the rightmost element in $c_2$, and so on, and the product of the first element on the left in $c_1$ and the rightmost element in $c_2$, respectively; the elements in the second row of the matrix from right to left are: one 0, the product of the rightmost element in $c_1$ and the second last element on the right in $c_2$, the product of the second last element on the right in $c_1$ and the second last element on the right in $c_2$, and so on, and the product of the first element on the left in $c_1$ and the second last element on the right in $c_2$, respectively; and elements in the n-th row of the matrix from right to left are: (n−1) zeros, the product of the rightmost element in $c_1$ and the first element on the left in $c_2$, the product of the second last element on the right in $c_1$ and the first element on the left in $c_2$, and so on, and the product of the first element on the left in $c_1$ and the first element on the left in $c_2$, respectively; then, each column of the constructed matrix is summed to obtain a new row vector; the row vector is taken as the result of the ciphertext multiplication operation; finally, the row vector is taken as the result of the ciphertext multiplication operation.

9. A homomorphic encryption circuit for implementing a homomorphic encryption method, the homomorphic encryption circuit comprising an input data register, a command register, a state register, a cryptographic operation circuit, a logic control circuit, an output data register, and a data storage area RAM; wherein the input data register is configured to obtain processed data and private data, transmit the processed data to the cryptographic operation circuit, and store the private data in the data storage area RAM for the cryptographic operation circuit;

the cryptographic operation circuit is configured to obtain private data from the data storage area RAM;

the command register is configured to obtain user commands from a local bus and transmit the user commands to the logic control circuit;

the logic control circuit is configured to control the cryptographic operation circuit to perform an encryption process, a decryption process, and a ciphertext operation process according to the user commands, and transmit the result to the state register, in which a random number used in the encryption process is generated by a random number generator;

the state register is configured to obtain an execution result from the logic control circuit and transmit the execution result via the local bus to the interface circuit;

the data storage area RAM is configured to transfer data processed by the cryptographic operation circuit to the output data register; and the output data register receives data from the data storage area RAM and transmits the data to the local bus.

* * * * *